United States Patent
Fainstain (10) Patent No.: US 9,836,200 B2
(45) Date of Patent: Dec. 5, 2017

(54) INTERACTING WITH ELECTRONIC DEVICES USING A SINGLE-POINT GESTURE

(71) Applicant: Evgene Fainstain, San Jose, CA (US)

(72) Inventor: Evgene Fainstain, San Jose, CA (US)

(*) Notice: Subject to any disclaimer, the term of this patent is extended or adjusted under 35 U.S.C. 154(b) by 513 days.

(21) Appl. No.: 14/457,135

(22) Filed: Aug. 12, 2014

(65) Prior Publication Data

US 2015/0261302 A1 Sep. 17, 2015

Related U.S. Application Data

(60) Provisional application No. 61/953,755, filed on Mar. 15, 2014.

(51) Int. Cl.
*G06F 3/033* (2013.01)
*G06F 3/0484* (2013.01)
*G06F 3/0481* (2013.01)
*G06F 3/0488* (2013.01)

(52) U.S. Cl.
CPC ...... *G06F 3/04845* (2013.01); *G06F 3/04815* (2013.01); *G06F 3/04883* (2013.01); *G06F 2203/04803* (2013.01); *G06F 2203/04806* (2013.01)

(58) Field of Classification Search
CPC .................................................. G06F 3/04845
USPC ...................................................... 345/665
See application file for complete search history.

(56) References Cited

U.S. PATENT DOCUMENTS

| 7,456,849 | B2 | 11/2008 | Brooke |  |
|---|---|---|---|---|
| 7,817,145 | B2* | 10/2010 | Klishko | G06F 3/0416 345/173 |
| 2007/0291014 | A1* | 12/2007 | Layton | G06F 3/03547 345/173 |
| 2010/0156806 | A1* | 6/2010 | Stallings | G06F 3/04883 345/173 |
| 2011/0029917 | A1* | 2/2011 | Um | G06F 3/04883 715/800 |
| 2011/0074830 | A1* | 3/2011 | Rapp | G06F 3/04883 345/677 |
| 2011/0109581 | A1* | 5/2011 | Ozawa | G06F 3/0481 345/173 |
| 2014/0059501 | A1 | 2/2014 | Yuu et al. | |

* cited by examiner

*Primary Examiner* — Jason Olson
(74) *Attorney, Agent, or Firm* — Georgiy L. Khayet (57) ABSTRACT

Disclosed are a system and a method for interacting with electronic devices using a single-point gesture. A single point is selected in an image provided by a display associated with an electronic device. The selected point is continuously moved to generate a trajectory. A bending of the trajectory is monitored while moving the selected point. In response to the monitoring of the bending, the electronic device is operable to perform, based at least on the bending of the trajectory, a designated action. For example, the image is moved along the trajectory and while being moved the image is zoomed in when the trajectory bends clockwise and the image is zoomed out when trajectory bends counter-clockwise. The scale of zooming is determined based on an area between a segment trajectory and a chord of trajectory found in a pre-determined time period or a pre-determined travel distance along the trajectory.

31 Claims, 7 Drawing Sheets

INTERACTING WITH ELECTRONIC DEVICES USING A SINGLE-POINT GESTURE

RELATED APPLICATIONS

The present application claims the benefit of U.S. Provisional Application No. 61/953,755, filed Mar. 15, 2014. The subject matter of the aforementioned application is incorporated herein by reference for all purposes.

TECHNICAL FIELD

This disclosure relates generally to systems and methods for interacting with electronic devices and more specifically to systems and methods for interacting with electronic devices using a single-point gesture.

BACKGROUND

Electronic devices with displays are used to present various information, such as text, diagrams, pictures, maps, and the like in graphical form as images. Touch-screen displays allow for manipulating images by touching the display at one or more locations and then moving the one or more points of contact in a certain mode. The certain mode of touching of a touchscreen and moving the points are referred to as a gesture.

There are many gestures currently in use. Some of them are simple. For example, to move an image, it is common to touch a point on the screen and then drag it.

A popular method for zooming an image using a gesture is to touch the display simultaneously at two different points with two fingers and then move these points in a pinching or "de-pinching" fashion to zoom in or out. In another example, a Television (TV) meteorologist may manipulate a big map with both of his or her hands; in this case, the "two points" are defined by hands, rather than fingers.

This "pinch" is a popular and intuitive gesture. However, its main drawback is that it requires at least two points of interaction. This method is not applicable in situations when a person holds a smart phone in one hand and cannot use the hand for the manipulations (for example, when someone riding in public transportation is holding a railing, or someone is driving and using a mapping application). In this case it is still possible to perform the touching and dragging comfortably, but not the pinching.

There are other gestures—although not in such common use as pinching—that offer a single-point control for these operations. For example, in some programs, one has to tap the display twice at the location of interest in order to zoom in. In other programs, one has to touch the display and wait a certain time until specific icons appear on the screen and then touch one of the icons in order to zoom in or out. It is also possible to add additional static icons/buttons on the screen to provide this flexibility.

The methods mentioned above have some downsides:
1) Double-tap to zoom in:
  a) Performing a double-tap may conflict with other double-tap functionalities; for example, you cannot use double-tap for any other functionality like putting down a pin or launching a website.
  b) Double-tap provides only the "zoom-in" functionality, but not the "zoom-out."
2) Additional buttons or static icons:
  a) The icons take up valuable screen "real-estate."
  b) To touch a button or an icon, one has to release the point being dragged (a point of interest).
  c) The location of the buttons may require a significant "travel distance" and may cause one to frequently "re-grip" the device (phone).
  d) The buttons do not define a center point for the operation (it is usually hard-coded to be the center point of the screen). So, if a person did not align a point of interest with the center point of the screen prior to the operation, he or she can easily lose that point while, for example, zooming or rotating an image.
3) Holding down for a period of time:
  a) This gesture is slow.
  b) It may conflict with simply putting down your finger and lingering a bit too long before starting a dragging operation.
  c) Again, it requires the user to "let go" of the point of interest.

None of the above variants of gestures have been intuitive/simple/useful enough to become widely accepted, therefore there is no unifying standard for a single-point zoom operation.

The technique disclosed herein proposes a new type of gesture, which requires only one point of contact, feels natural, and allows controlling multiple parameters (for example, panning the image, zooming in and out around specific points and, in some embodiments, rotating around the same point); all operations can be done in one smooth motion. In addition, the gesture can be used to control even more parameters; for example, a single motion can be used to control two-dimensional position, scale, rotation, brightness, contrast and saturation of the image.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to an aspect of the present disclosure, a method is provided for interacting with an electronic device using a single-point gesture. The method may include selecting a point in an image, wherein the image is being presented by a display associated with the electronic device. The method may further proceed with continuously moving the selected point to generate a trajectory. While moving the selected point, the method may allow for monitoring of a bending of the trajectory. In response to the monitoring, the method may proceed further with performing, based at least on the bending of the trajectory, a designated action.

In some embodiments, the designated action may include a transformation of the image presented by the display. For example, the image can be moved along the trajectory and while being moved the image can be zoomed in when the trajectory is bending clockwise, and the image can be zoomed out when the trajectory is bending counterclockwise. In some embodiments, the scale of the zooming in and the zooming out can be based on a measure of the bending of the trajectory. In certain embodiments, the measure of the bending of the trajectory can be determined as an area between a segment of the trajectory and a chord of the trajectory determined within a pre-determined time period or within a pre-determined distance of the trajectory path. In some embodiments, the image is not zoomed in or zoomed out if the measure of bending of the trajectory is below a predetermined minimum value.

In certain embodiments, while continuously moving the selected point within the display, the method may further include determining that the selected point is located within a designated region of the display. In response to the determination, the method may further allow for performing, based at least on a location of the selected point and direction in which selected point is moving, a further designated action. In certain embodiments, the designated region may include a strip located near an edge of the display. In various embodiments, the further designated action may include further transformation of an image presented by the display.

In some embodiments, the further transformation may depend on a transformation parameter that can be changed in response to moving the selected point along the strip. For example, the further transformation may include rotation of the image. The angle of the rotation can be changed in response to moving the selected point along the strip. In various embodiments, the further transformation of the image may include a saturation of the image, contrast of the image, brightness of the image, and sharpness of the image.

According to another aspect of the present disclosure, a system for interacting with an electronic device using a single point gesture is provided. The system may comprise a processor and a display associated with the electronic device and communicatively coupled to the processor. The processor may be configured to perform the steps of the method for interacting with the electronic device using a single-point gesture.

In further example embodiments of the present disclosure, the method steps are stored on a machine-readable medium comprising instructions, which when implemented by one or more processors perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer, a car computer), game console, handheld gaming device, cellular phone, smart phone, photo and video camera, a smart TV set, and so forth.

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments.

EXAMPLE 1

According to an example embodiment, the method for interacting with an electronic device using a single-point gesture may include selecting a point in an image. The image may be provided by a display of the electronic device. The method may further include continuously moving the selected point within the display to generate a trajectory. While continuously moving the selected point, the method may allow for monitoring a bending of the trajectory. In response to monitoring the bending of the trajectory, the method may include performing one or more designated actions. The designated actions may include a transformation of the image (for example moving the image and scaling the image).

Figure 1:
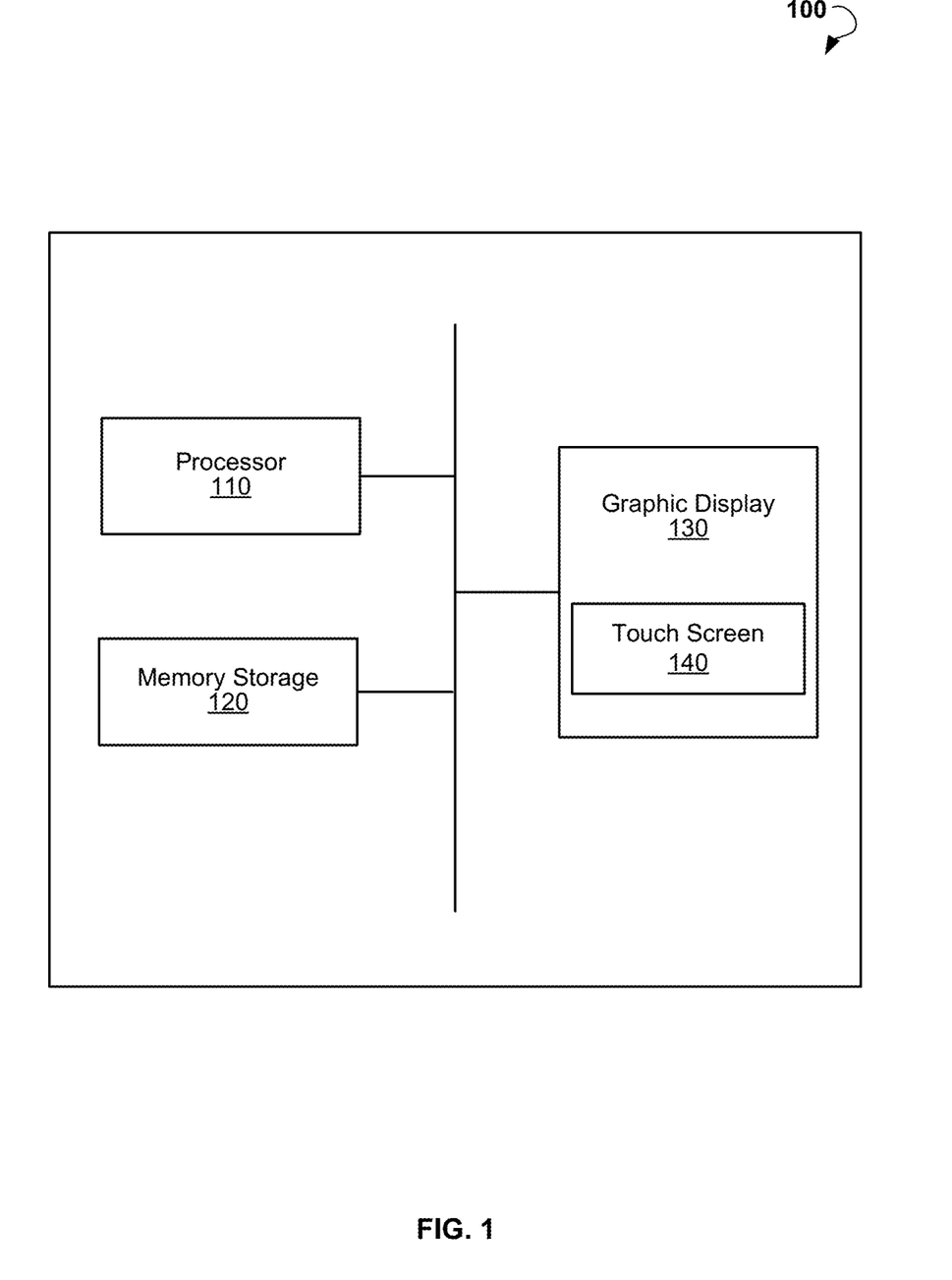
FIG. 1 illustrates a block diagram showing components of an example electronic device, wherein the method for interacting with electronic devices using a single-point gesture can be practiced.

FIG. 1 is a block diagram showing components of an electronic device 100, wherein technologies described herein can be practiced. The example electronic device 100 includes at least a processor 110 communicatively coupled to a memory storage 120 and a graphic display system 130. In some embodiments, the electronic device 100 may include further components necessary for the electronic device's operations. In some embodiments, processor 110 includes hardware and software implemented as a processing unit, which is operable to process floating point operations and other operations for the processor 110. In some embodiments, processor 110 may execute instructions and modules stored in the memory storage 120 to perform functionality described herein, including the method for interacting with electronic device using a single-point gesture. The graphic display system 130 can be configured to provide a graphic user interface. In some embodiments, a touch screen 140 associated with the graphic display system 130 can be utilized to receive an input from a user including a single-point gesture.

In some embodiments, the graphic display system 130 can be configured to display an image. A user may touch the display with a finger or a stylus to select a point in the image. The user may further continuously move the point of contact within the display range to generate a trajectory (i.e., to generate a single-point gesture). While the point is being continuously moved, the electronic device can monitor the bending of the trajectory. In some embodiments, the image can be scaled in when the trajectory bends clockwise. Respectively, the image can be scaled out when the trajectory bends counterclockwise. The scale or degree of scaling in and scaling out can be determined from a degree of bending the trajectory and the speed of moving the point; the greater the bending and the faster the motion—the more the image is scaled.

Figure 2:
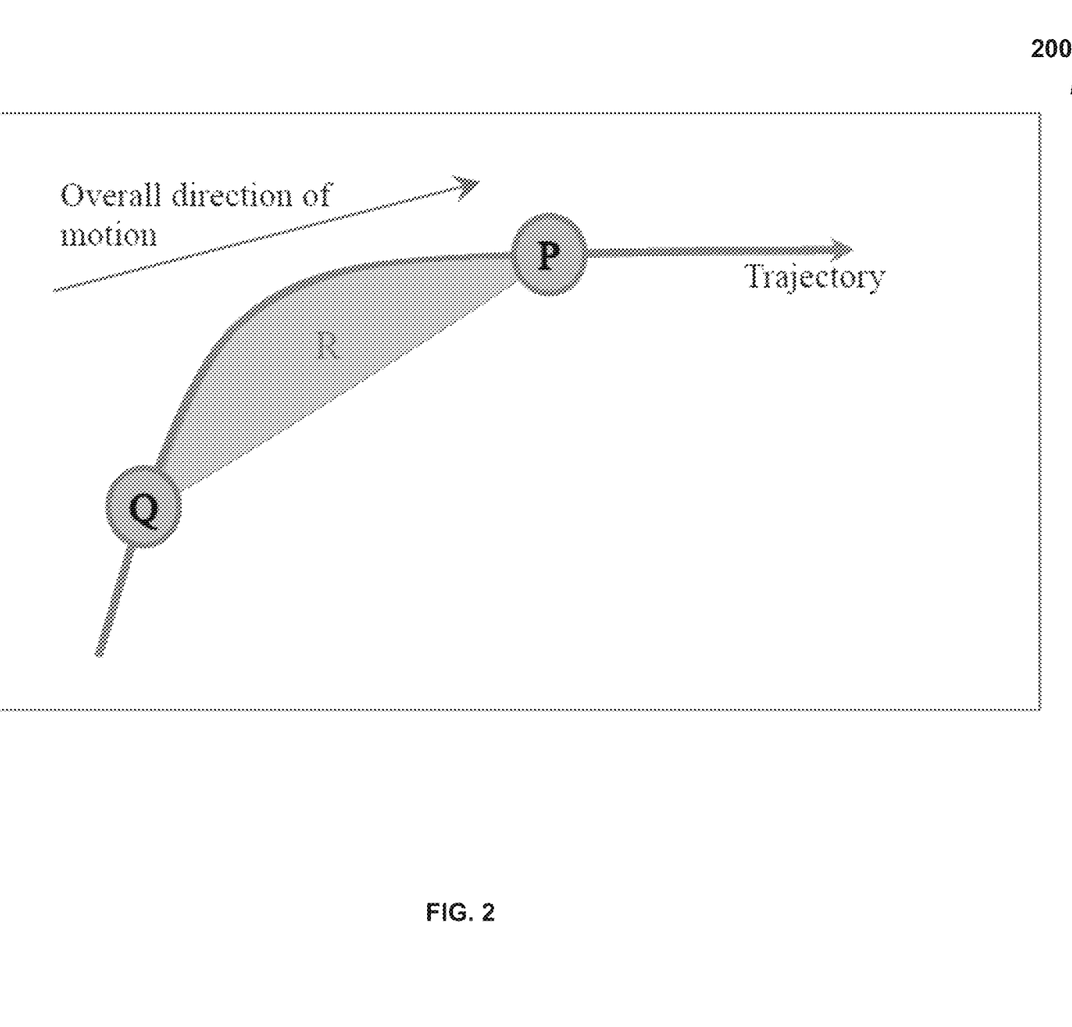
FIG. 2 illustrates an example of a trajectory generated by a single-point gesture and the corresponding measure of bending.

FIG. 2 illustrates an example trajectory 200 generated by a single-point gesture. Point "P" in FIG. 2 represents a location at a current moment of the point of contact, moving along the shown trajectory, from the bottom-left to the right. Point "Q" represents a location of the point of contact at some previous moment, lagging from the current moment by specific amount of time $T_{lag}$ or by a specific distance along the trajectory or both.

In some embodiments, the area of the shaded region R can be used as a measure of the trajectory's bending. It should be noted that the area of the region R depends on the lagging time $T_{lag}$. In some embodiments, the proper selection of $T_{lag}$ may allow ignoring bends that happen at a very low speed or after the point of contact has paused for a while. Thus, only relatively quick, energetic bends will affect the zoom.

In some embodiments, the area of the region R can be measured periodically when the point of contact is moving. In certain embodiments, one or more subsequently measured areas of regions R can be integrated over time in a predefined manner. The result of the integration, Z, may determine zoom at a current moment t. For example, if information about the location of the point of contact becomes available at moments $t_0, t_1, t_2, \ldots t_n = t$, Z may be calculated as $$Z = A_1 dt_1 + A_2 dt_2 + \ldots + A_n dt_n \quad (1)$$

wherein $dt_1 = t_1 - t_0$, $dt_2 = t_2 - t_1$ and so on, and $A_1, A_2, \ldots$ are areas of the region R measured at moments $t_1, t_2, \ldots$, and so on. It should be noted that areas $A_i$ in formula (1) are positive for the clockwise bends of the trajectory and negative for counterclockwise bends. In example of FIG. 2, value of the area of the region R is positive when the point of contact is moved in the direction shown from point "Q" to point "P." If the point of contact were moving in the opposite direction, from point "P" to "Q," the area would be negative. Thus, a Z value determined by formula (1) can also be positive and negative, corresponding to zoom-in and zoom-out scaling.

In some embodiments, when translating integrated area value Z into the value of zoom, Z values that are below a certain threshold can be ignored. This may be useful in situations when the user wants simply to drag the image. There is no need to move the point of contact along an exactly straight trajectory. While dragging the image; small deviations from straightness or smooth bends will not trigger the zooming action.

Figure 3:
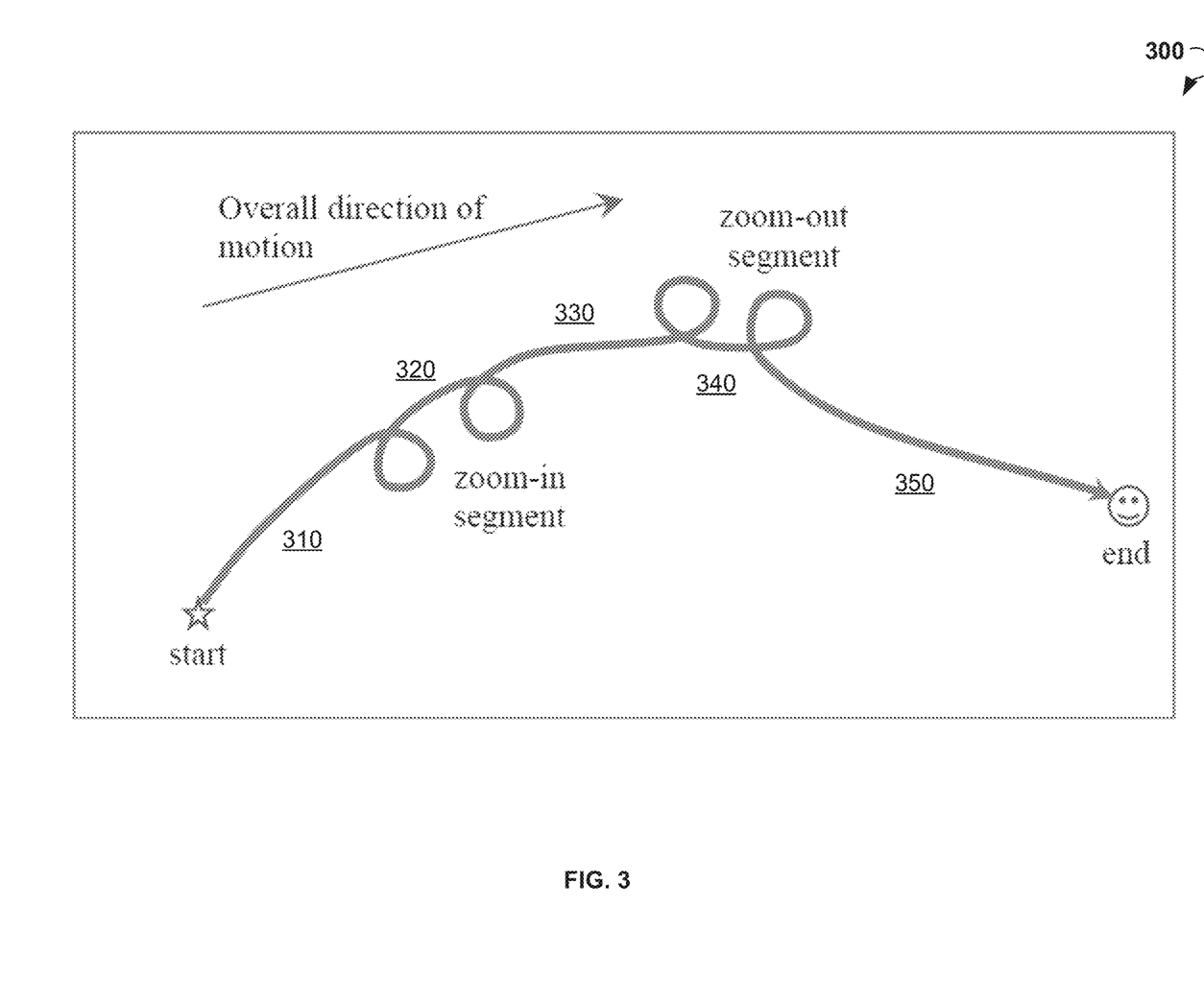
FIG. 3 illustrates an example of a complex trajectory generated by a single-point gesture.

FIG. 3 illustrates an example of a complex trajectory 300 generated by a single-point gesture. In illustrated example, the trajectory has "no-bending" segments 310, 330, and 350, a "clockwise bending" segment 320, and "counterclockwise bending" segment 340. An electronic device may monitor the bending of the trajectory and, in response to monitoring, apply designated actions to a displayed image. The image at first is dragged at segment 310, then significantly zoomed in at segment 320, then dragged a little bit more at segment 330, then zoomed out at segment 340, and dragged further at segment 350. It should be noted that all these operations can be achieved in one continuous smooth motion without ever terminating the contact with the touch screen and also without losing a location in the image. As opposed to other zooming gestures, the scaling is always performed around the point of contact. In some embodiments, the scaling is carried around a point at a fixed displacement from the point of contact. Therefore, the part of the image around the point of contact always remains within sight.

In some embodiments, in addition to monitoring the bending of the trajectory generated by continuously moving a point of contact on a display, a current location of the moving point can be also monitored. In some embodiments, one or more regions on the display can be designated to control an additional parameter for transforming or editing a displayed image. When the point of contact is moving across the designated region, a corresponding parameter of the image (for example, angle of rotation of image, contrast of image, saturation of image, sharpness of the image, and so on) can be changed. In some embodiments, the designated regions may be located near the edges of the display. The designated region may have a shape of relatively narrow strips. Moving the point of contact in one direction along the strip would increase the corresponding parameter, while motion in the opposite direction would decrease it.

Figure 4:
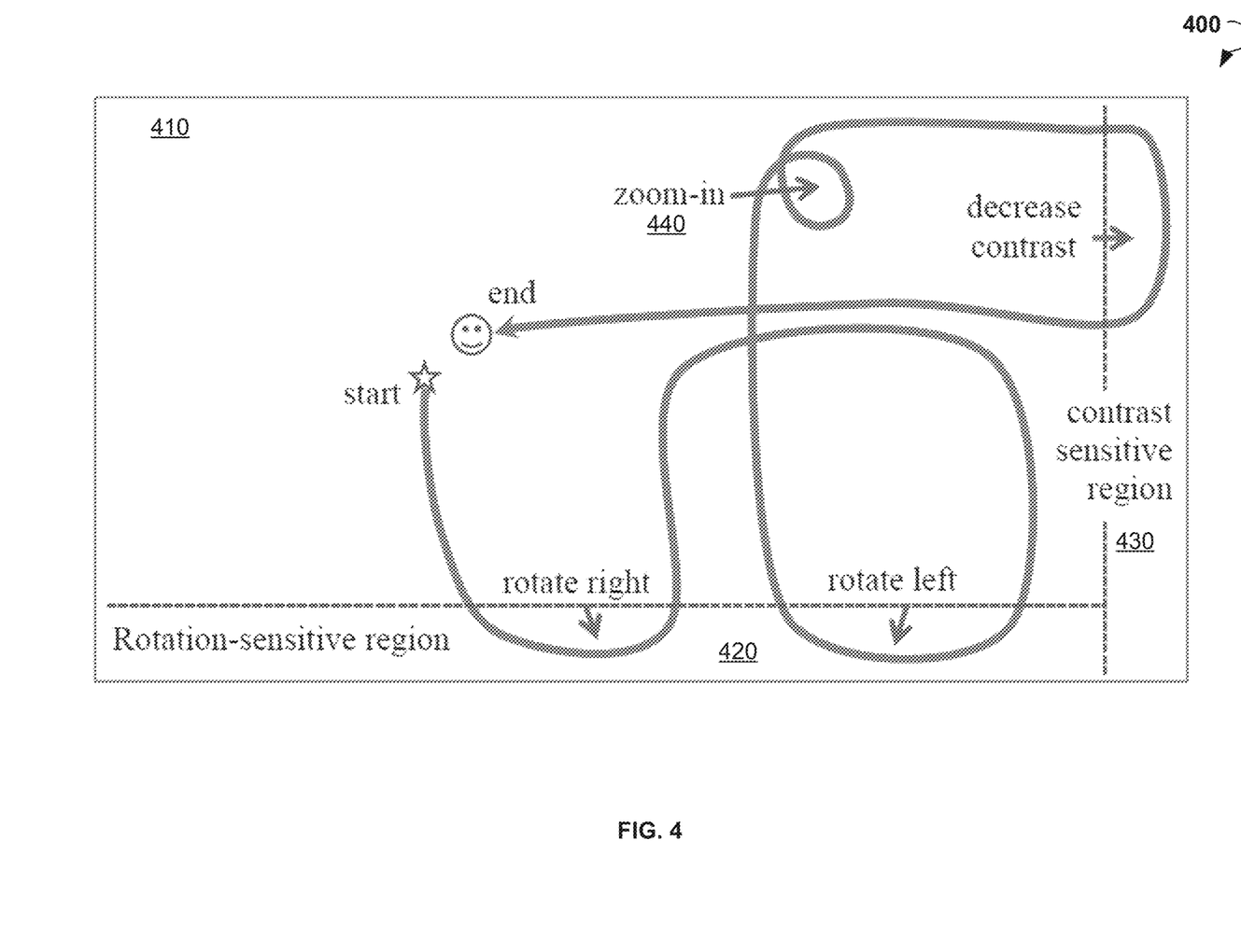
FIG. 4 illustrates an example of another complex trajectory generated by a single-point gesture.

FIG. 4 illustrates an example of another complex trajectory 400 generated by a single-point gesture. In example of FIG. 4, a display 410 of an electronic device has two designated regions 420 and 430 shaped as strips located near the bottom and right edges of the display. The region 420 is designated for controlling the rotation of a displayed image and referred as a "rotation-sensitive" region, while the region 430 is designated for controlling contrast of the image and can be referred as "contrast-sensitive" region.

In response to monitoring the bending (curvature) and location of the example trajectory 400, the electronic device may apply the following action to a displayed image. The image at first is moved downwards, then the image is rotated clockwise after the point of contact reaches the "rotation-sensitive" region 420. While the contact point is at the rotation-sensitive region and is moving from left to right, the image is rotated clockwise while being dragged to the right at the same time. The image is then dragged up, right, and back down at the next segments of the trajectory 400. When the trajectory 400 returns back to "rotation-sensitive" region 420, the image is rotated counterclockwise since the point of contact is moving from right to left and while being rotated the image is dragged to the left. Next, after the trajectory 400 leaves the "rotation-sensitive" region 420 for second time, the image is dragged upward. Further, the image is zoomed in when the trajectory 400 bends clockwise at region 440 and dragged right. After the trajectory 400 enters "contrast-sensitive" region 430, the contrast of the image is decreased since the trajectory 400 moved from up to down. At the last segment of the trajectory 400, the image is dragged left back to the start point. It should be appreciated by those skilled in art that all the operations associated with trajectory 400 can be achieved in one continuous motion.

Figure 5:
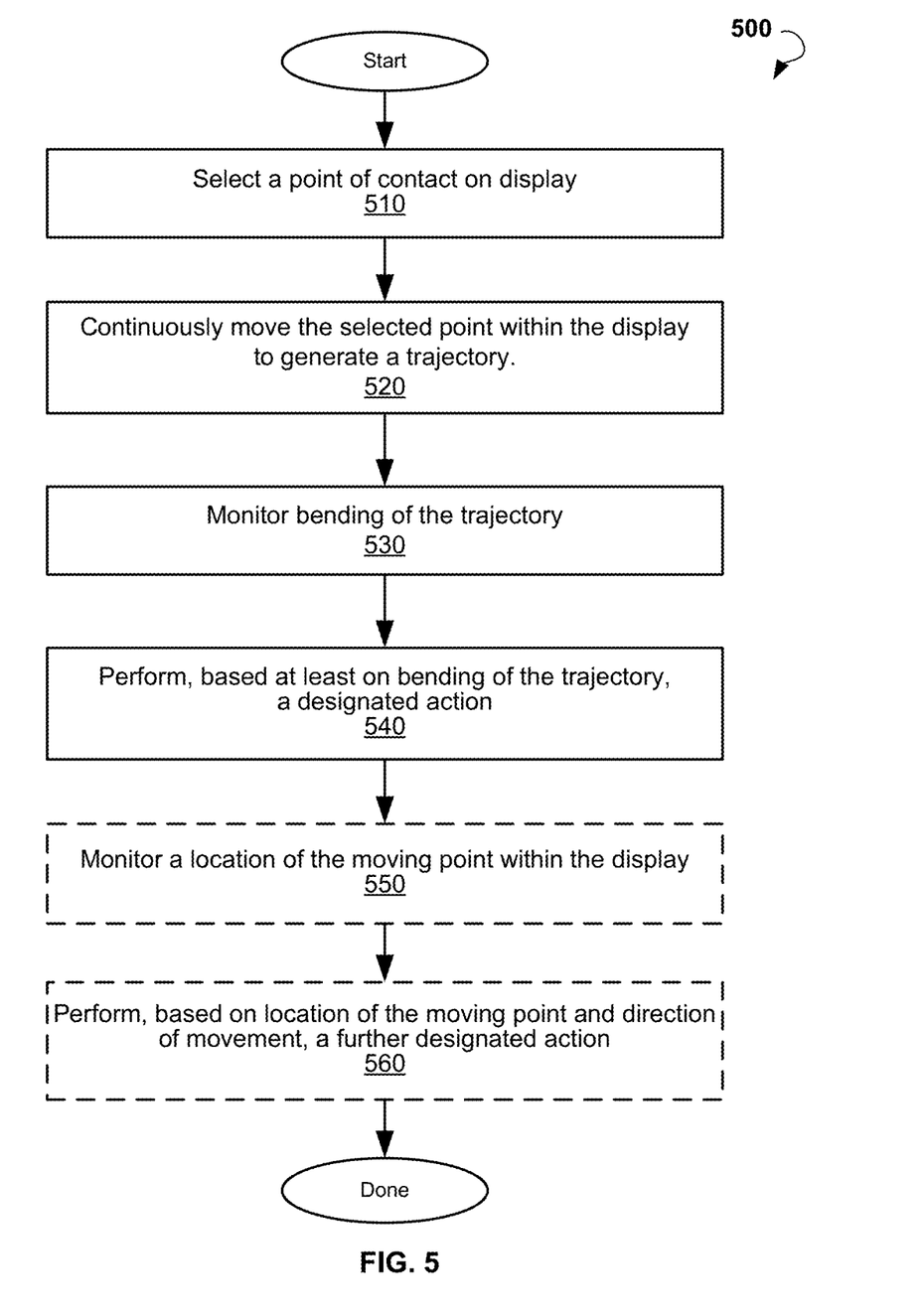
FIG. 5 is a flow chart showing steps of a method for interacting with electronic devices using a single-point gesture, according to an example embodiment.

FIG. 5 illustrates a flow chart showing a method 500 for interacting with an electronic device using a single-point gesture. The method may commence at step 510 with selecting a point of contact on display. In step 520, the method 500 may proceed with continuously moving the selected point within the display range to generate a trajectory. In step 530, the method 500 includes monitoring bending of the trajectory. In step 540, the method 500 may continue with performing, based at least on bending of the trajectory, a designated action. In optional step 550, the method may include monitoring a location of the moving point within the display. In optional step 560, the method 500 may further proceed with performing, based on the location of the moving point and the direction of the movement, a further designated action.

EXAMPLE 2

Figure 6:
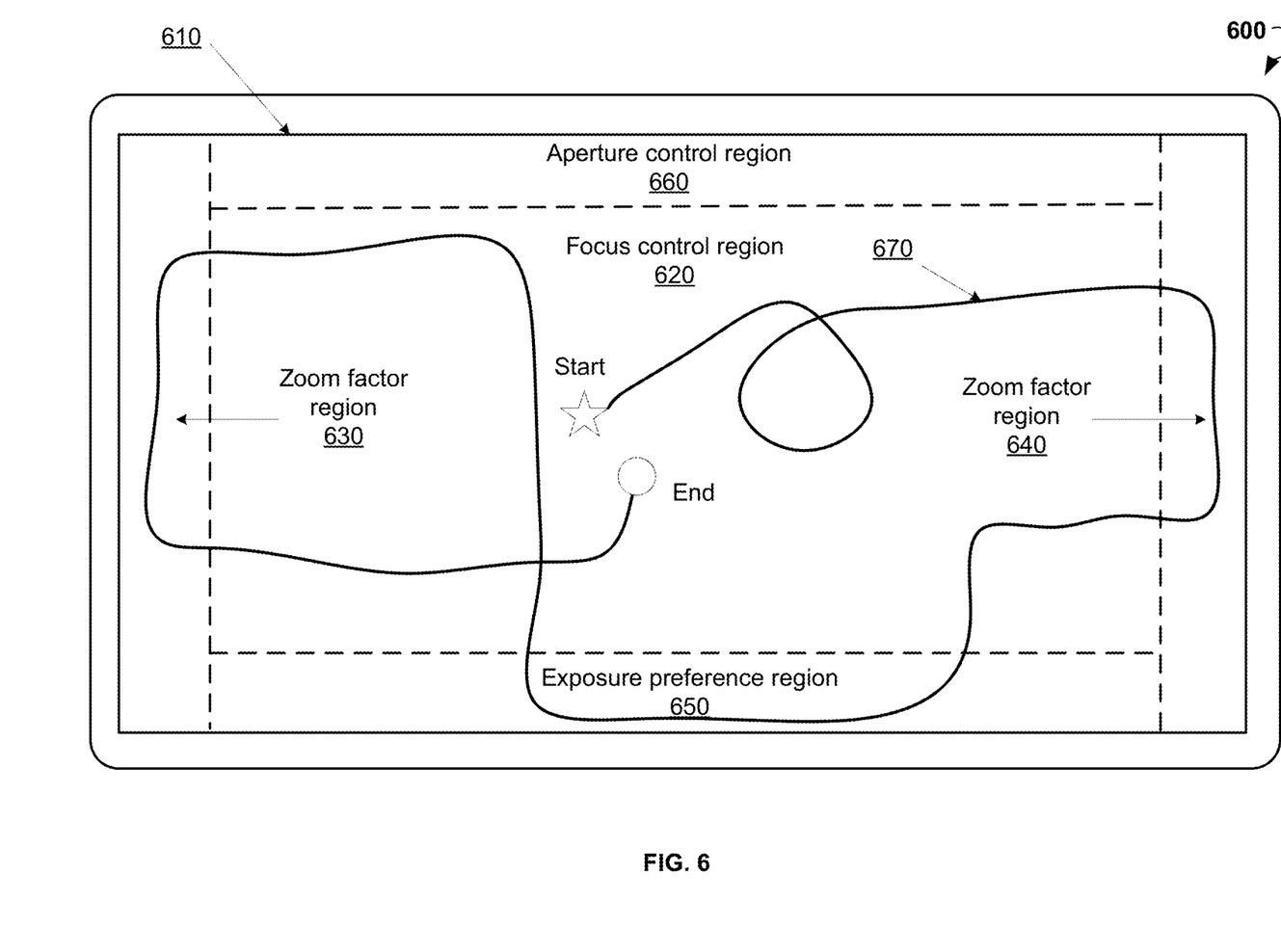
FIG. 6 is block diagram showing a back side of an example electronic device, wherein the method for interacting with electronic devices using a single-point gesture can be practiced

FIG. 6 is a block diagram showing a back side of an example electronic device 600. In various embodiments, the example electronic device 600 may represent a photo camera, a smart phone, a tablet computer, and any other device configured to take photo pictures and/or video records. The example electronic device 600 may be equipped with at least a photo camera and a touch screen 610 to provide a graphic user interface. In some embodiments, the touch screen can 610 be configured to read a single-point gesture, which is a complex trajectory generated by moving a selected point. In FIG. 6, an example complex trajectory 670 is shown.

In some embodiments, the touch screen 610 may include one or more designated regions located near the edges of the touch screen 610 to control parameters of photo camera. In example of FIG. 6, the touch screen 610 may include zoom factor regions 630 and 640, exposure preference region 650, and aperture control setting. In other embodiments, the regions may be assigned to control other photo parameters like the ISO setting, shutter speed, and so on. In some embodiments, the central region 620 of the touchscreen 610 may be configured to control a focus of the photo camera.

In some embodiments, by making clockwise and counterclockwise trajectories in region 620, a user can control the focus of the photo camera. By sliding along the vertical edges of regions 630 or 640, one can control the zoom factor of a photo camera. Sliding along the bottom edge of region 650 can control the exposure preference (darker/lighter). In various embodiments, sliding along the top edge of region 660 can control the aperture. In other embodiments, the designated regions can be assigned to control the ISO setting, or shutter speed, and other parameters of photo camera.

EXAMPLE 3

In some embodiments, single-point gestures in the shape of complex trajectories can be used to control applications on a desktop or notebook computer by a computer mouse without a (scrolling) wheel. For example, clockwise and counterclockwise loops can be used instead of the mouse wheel to scroll up and down application's window. In a photo viewing application, a clockwise/counterclockwise motion can control the zoom factor. In a video viewing/editing application, a clockwise/counterclockwise motion can control fast forwarding/rewinding, or volume, and so on.

EXAMPLE 4

In some embodiments, a single-point gesture can be used for controlling a first-person-shooter game on a touch-based device (smartphone) with one hand. Regular dragging would control the look direction. Clockwise/counterclockwise loops can control the speed (or displacement) forwards/backwards.

EXAMPLE 5

In some embodiments, a single-point gesture in the shape of a complex trajectory may be used for controlling a 3D mapping application with one hand. For example, dragging segments of the trajectory may be used to move the map. Clockwise/counterclockwise loops may be used to zoom-in/zoom-out of the map. Sliding along the bottom edge of display may rotate the map or rotate the viewer's camera. Sliding along the vertical edges (either left or right) may control the perspective (angle of 3D plane inclination). Sliding along the vertical edge may change the transparency ratio of synthetic info (roads, text) versus the satellite-based 3D imagery.

EXAMPLE 6

In some embodiments, a single point gesture in the shape of a complex trajectory can be used while reading a text document on a touch-based device (smartphone) to control text layout by using only one hand. For example, a no-bending segment of trajectory may be used to move the text along the direction of the trajectory. Bending segments of the trajectory, for example, clockwise and counterclockwise loops, may be used to zoom in and zoom out the text, respectively.

EXAMPLE 7

In other embodiment, a single point gesture in the shape of a complex trajectory may be used to control browsing a photo album on a computer, notebook, tablet computer, smartphone, and the like. By way of example and not limitation, a no-bending segment of trajectory may be used to drag around pictures. Clockwise and counterclockwise loops of the trajectory may be used to perform zooming in and zooming out of the image view. In certain embodiments, bending the trajectory clockwise and counterclockwise may be used to transition between pictures.

Figure 7:
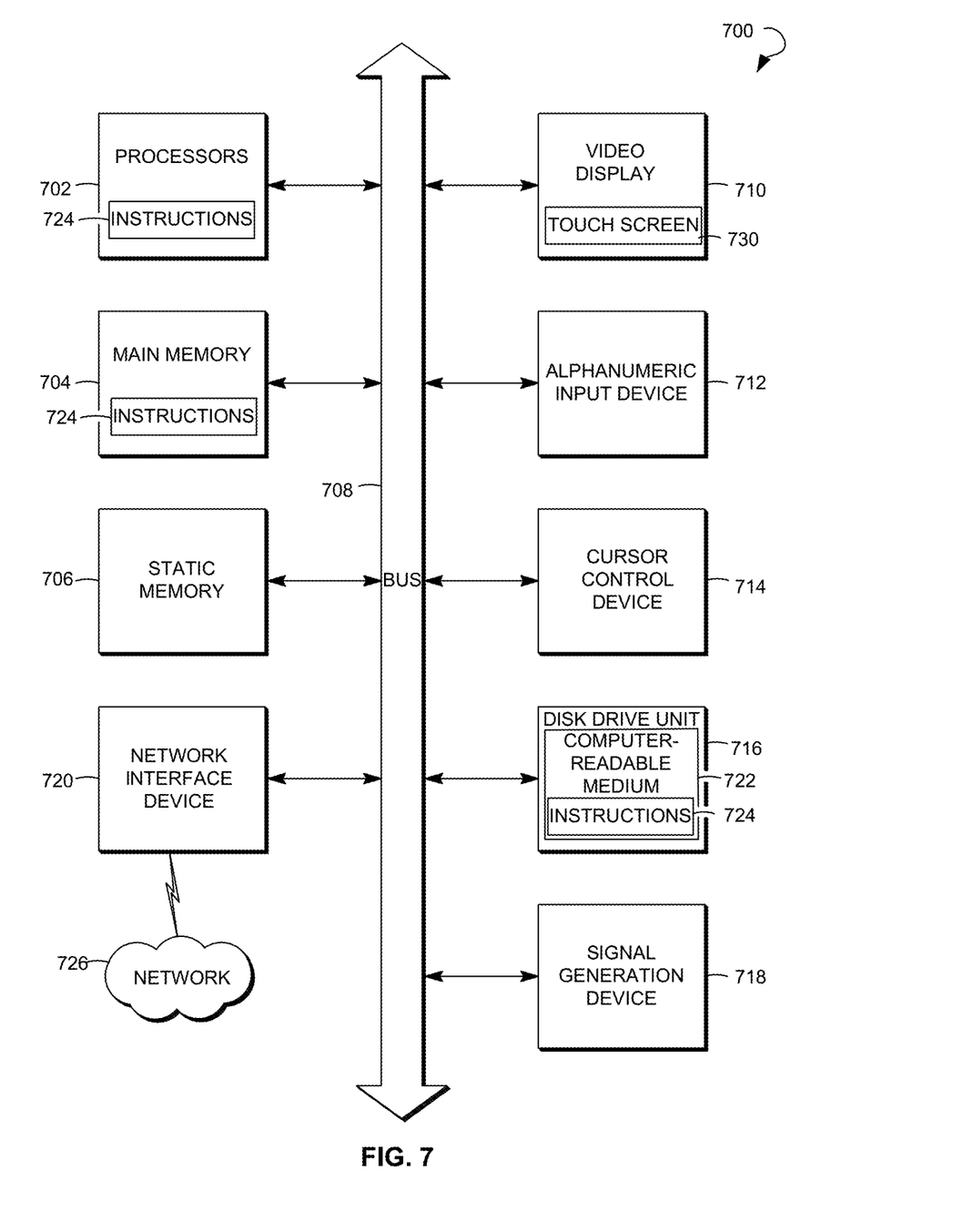
FIG. 7 illustrates a diagrammatic representation of an example machine in the form of a computer system within which a set of instructions for causing the machine to perform any one or more of the methodologies discussed herein is executed.

FIG. 7 illustrates a diagrammatic representation of an example machine in the form of a computer system within which a set of instructions for causing the machine to perform any one or more of the methodologies discussed herein is executed. A computer system 700 may include a set of instructions for causing the machine to perform any one or more of the methodologies discussed herein. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a tablet computer, a car computer with a touchscreen user interface, a cellular telephone, a smartphone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 may also include an alphanumeric input device 712 (e.g., a keyboard), a cursor control device 714 (e.g., a mouse), a disk drive unit 716, a signal generation device 718 (e.g., a speaker), and a network interface device 720. The computer system 700 may further include a touch input device, such as a touch screen 730, touch pad, a multi touch surface, and so forth. The computer system 700 may also include a gesture recognizing device, for example, a wired glove, a depth camera, an infrared (IR) camera, stereo camera, and the like.

The disk drive unit 716 includes a computer-readable medium 722, on which is stored one or more sets of instructions and data structures (e.g., instructions 724) embodying or utilized by any one or more of the methodologies or functions described herein. The instructions 724 may also reside, completely or at least partially, within the main memory 704 and/or within the processors 702 during execution thereof by the computer system 700. The main memory 704 and the processors 702 may also constitute machine-readable media.

The instructions 724 may further be transmitted or received over a network 726 via the network interface device 720 utilizing any one of a number of well-known transfer protocols (e.g., Hyper Text Transfer Protocol (HTTP)).

While the computer-readable medium 722 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks (DVDs), random access memory (RAM), read only memory (ROM), and the like.

The example embodiments described herein may be implemented in an operating environment comprising software installed on a computer, in hardware, or in a combination of software and hardware.

Thus, systems and methods for interacting with electronic devices using a single-point gesture have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

The invention claimed is:

1. A computer-implemented method for interacting with an electronic device using a single-point gesture, the method comprising:
   selecting a point in an image, the image being provided by a display associated with the electronic device;
   continuously moving the selected point within the display to generate a trajectory; while moving the selected point:
      monitoring a bending of the trajectory between a first point of the trajectory and a second point of the trajectory, wherein the first point corresponds to a current time and the second point corresponds to a previous time; and
      in response to the monitoring, performing, based at least on the bending of the trajectory, a designated action, wherein the designated action is selected based on a measure of the bending; and
   while continuously moving the selected point within the display:
      determining that the selected point is within a designated region of the display; and
      in response to the determination, performing, based at least on a location of the selected point and direction of the moving the selected point, a further designated action.

2. The method of claim 1, wherein the designated action is a transformation of the image.

3. The method of claim 1, wherein the selecting the point and moving the selected point is carried out by a finger or a stylus pen of a user.

4. The method of claim 2, wherein the transformation of the image includes moving the image along the trajectory.

5. The method of claim 4, wherein the transformation of the image further includes one of the following:
   zooming in the image when the trajectory is bending clockwise; and zooming out the image when the trajectory is bending counterclockwise or vice versa.

6. The method of claim 5, wherein scale of the zooming in and scale of the zooming out are based on the measure of the bending of the trajectory.

7. The method of claim 6, wherein the measure of the bending of the trajectory is an area between the trajectory and a chord connecting the first point and the second point, wherein the first point and the second point are distant by a pre-determined time period.

8. The method of claim 6, wherein the measure of the bending of the trajectory is an area between the trajectory and a chord connecting the first point and the second point, wherein the first point and the second point are distant by a pre-determined travel distance along the trajectory.

9. The method of claim 6, wherein the zooming in the image or zooming out the image is not performed when the measure of the bending of the trajectory is below a pre-determined minimum value.

10. The method of claim 7, wherein the scale of the zooming in and scale of the zooming out is determined by formula:

$$Z = A_1 dt_1 + A_2 dt_2 + \ldots + A_n dt_n,$$

wherein $dt_i = t_i - t_{i-i}$ and $A_i$, are areas between the trajectory and the chord of the trajectory found in time period from $t_i-1$ to $t_i$ for $i=1, \ldots, n$.

11. The method of claim 1, wherein the designated region is a strip located near an edge of the display.

12. The method of claim 11, wherein the further designated action is a further transformation based on a transformation parameter.

13. The method of claim 12, wherein a single parameter is changed in response to moving the point along the strip.

14. The method of claim 12, wherein the further transformation is a rotation of the image and the transformation parameter is an angle of the rotation of the image.

15. The method of claim 12, wherein the further transformation is one of the following: a saturation of the image, contrast of the image, brightness of the image, sharpness of the image.

16. A system for interacting with an electronic device using a single-point gesture, the system comprising:
 a processor;
 a display in communication with the processor, the display being associated with the electronic device, wherein the processor is configured to:
  monitor a bending of a trajectory between a first point of the trajectory and a second point of the trajectory, the trajectory being generated by continuously moving a point, the point being selected in an image, the image being provided by the display, wherein the first point corresponds to a current time and the second point corresponds to a previous time;
  in response to the monitoring, perform, based at least on the bending of the trajectory, a designated action, wherein the designated action is selected based on a measure of the bending;
  determine that the selected point is moving within a designated region of the display; and
  in response to the determination, perform, based at least on a location of the selected point and direction of moving the selected point, a further designated action.

17. The system of claim 16, wherein the designated action is a transformation of the image.

18. The system of claim 16, wherein the selecting the point and moving the selected point is carried out by one of the following: a finger of a user, a stylus pen of the user, and a hand of the user, the hand being waved in front of the display.

19. The system of claim 16, wherein the transformation of the image includes moving the image along the trajectory.

20. The system of claim 19, wherein the transformation of the image further includes one of the following:
 zooming in the image when the trajectory is bending clockwise; and zooming out the image when the trajectory is bending counterclockwise or vice versa.

21. The system of claim 20, wherein a scale of the zooming in and scale of the zooming out are based on the measure of the bending of the trajectory.

22. The system of claim 21, wherein the measure of the bending of the trajectory is an area between the trajectory and a chord connecting the first point and the second point, wherein the first point and the second point are distant by a pre-determined time period.

23. The system of claim 21, wherein the measure of the bending of the trajectory is an area between the trajectory and a chord connecting the first point and the second point, wherein the first point and the second point are distant by a pre-determined travel distance along the trajectory.

24. The system of claim 21, wherein the zooming in the image or zooming out the image is not performed when the measure of the bending of the trajectory is below a pre-determined minimum value.

25. The system of claim 22, wherein the scale of the zooming in and scale of the zooming out is determined by formula:

$$Z = A_1 dt_1 + A_2 dt_2 + \ldots + A_n dt_n,$$

wherein $dt_i = t_i - t_{i-i}$ and $A_i$, are areas between the trajectory and the chord of the trajectory found in time period from to $t_{i-1}$ to $t_i$ for $i=1, \ldots, n$.

26. The system of claim 16, wherein the designated region is a strip located near an edge of the display.

27. The system of claim 16, wherein the further designated action is a further transformation based on a transformation parameter.

28. The system of claim 27, wherein a single parameter is changed in response to moving the point along a strip.

29. The system of claim 28, wherein the further transformation is a rotation of the image and the transformation parameter is an angle of the rotation of the image.

30. The system of claim 27, wherein the further transformation is one of the following: a saturation of the image, contrast of the image, brightness of the image, sharpness of the image.

31. A non-transitory computer-readable medium having instructions stored thereon, which when executed by one or more processors, perform the following operations:
 selecting a point in an image, the image being provided by a display associated with an electronic device;
 continuously moving the selected point to generate a trajectory; and
 while moving the selected point:
  monitoring a bending of the trajectory between a first point of the trajectory and a second point of the trajectory, wherein the first point corresponds to a current time and the second point corresponds to a previous time;
  in response to the monitoring, performing, based at least on the bending of the trajectory, a designated action, wherein the designated action is selected based on a measure of the bending; and
  determining that the selected point is moving within a designated region of the display; and in response to the determination, performing, based at least on location of the selected point and direction of the moving of the selected point, a further designated action.

\* \* \* \* \*